United States Patent [19]
Auricchio et al.

[11] Patent Number: 5,483,655
[45] Date of Patent: Jan. 9, 1996

[54] METHOD FOR EXTENDED FILE ACCESS

[75] Inventors: Richard R. Auricchio, Los Gatos; Bryan J. Stearns, Santa Clara, both of Calif.

[73] Assignee: Apple Computer, Inc., Cupertino, Calif.

[21] Appl. No.: 303,564

[22] Filed: Sep. 9, 1994

Related U.S. Application Data

[63] Continuation of Ser. No. 722,027, Jun. 27, 1991, abandoned.

[51] Int. Cl.$^6$ .................................................... G06F 9/44
[52] U.S. Cl. ................................ 395/700; 364/DIG. 1; 364/280
[58] Field of Search ............................ 395/200, 650, 395/700; 364/DIG. 1

[56] References Cited

U.S. PATENT DOCUMENTS 4,825,354  4/1989  Agrawal et al. .
5,155,809  10/1992  Baker et al. ............................ 395/200

OTHER PUBLICATIONS

Unix Programmer's Manual, 7th Edition, Bell Telephone Laboratories, Inc., Copyright 1979, 1983, pp. 210, 226, 230, 231, 240.

*Primary Examiner*—Kevin A. Kriess
*Attorney, Agent, or Firm*—Mark A. Aaker

[57] ABSTRACT

A method of extended file access that allows a program running on a computer to access file types, beyond the "standard" file types whose formats have been pre-defined to the operating system, by placing the extended file data in a range of addresses outside the range of addresses of the recorded file data. The extended file data is accessed by positioning a file pointer to a location in the extended range of addresses, and accessing the extended file data at the location of the file pointer. A further embodiment includes preventing further access until the file pointer is repositioned. In this way, extended file data, such as additional characteristics of the file, can be accessed, though these characteristics are not specifically known to the operating system.

5 Claims, 2 Drawing Sheets

METHOD FOR EXTENDED FILE ACCESS

This is a continuation of application Ser. No. 07/722,027, filed Jun. 27, 1991, now abandoned.

BACKGROUND OF THE INVENTION

This invention relates to a method for extending the types of files that can be accessed by a program running on a computer.

Computers are controlled by software, known as the operating system, which can access and control those types of files whose characteristics have been pre-defined for the operating system. For example, definitions will exist concerning the characteristics of how files are named, how they are located on storage devices, how they are organized in blocks or records, and how they can be read, written or otherwise manipulated. A program running on the computer will use the services of the operating system to access these standard files stored on storage devices attached to the computer.

A particular operating system will only know a particular set of file characteristics, and therefore can access only file types using those file characteristics. For example, Table I shows the file characteristics defined for the IEEE Standard 1103.1-1990 POSIX operating system, an operating system related to the UNIX operating system (UNIX is a Registered Trademark of AT&T Information Systems). While this operating system is perfectly functional when dealing with its own file types, it is limited in accessing more complex file types having additional file characteristics.

For example, Table II shows the file characteristics defined for the ISO 9660 file format, which is commonly used for CD-ROM media. The file characteristics defined for ISO 9660 provide a wealth of information regarding the source of the file data, where and when it was prepared, and other valuable descriptive information, most of which have not been defined to and cannot be accessed by the POSIX operating system. For example, if it is desired to use a POSIX operating system to read an ISO 9660 media, some of the ISO 9660 file characteristics, such as "size" or "last modification date," can be easily mapped to characteristics known to the POSIX operating system. Other file characteristics, such as "System Identifier" or "Publisher Identifier," have no correspondence to characteristics known to the POSIX operating system.

To extend an operating system to understand additional file characteristics and therefore additional file types has been a difficult task. It requires the availability of source-language programming code for the operating system. Even if the source-language programming code is available, the modifications can be a time-consuming job requiring a high level of computer programming expertise.

For example, to extend a UNIX operating system to understand additional file characteristics, it is common to have new system calls, traps or "ioctl" system call definitions implemented into the operating system. But, making such changes to the operating system is difficult, and can degrade the reliability of the operating system as unintentioned side effects arise. Sometimes it is preferred to avoid such modifications to reduce on-going maintenance and support requirements.

What is desired is a method of extending the types of files that can be accessed by a program running on a computer without requiring extensive modification to the operating system.

SUMMARY OF THE INVENTION

This invention provides a method for extended file access that allows a program running on a computer to access file types beyond the "standard" file types whose formats have been pre-defined to the operating system. By "access," we mean the ability to read and write a file, and to read and write the additional characteristics about the file, for example, for an ISO 9660 file, to read and write the "Publisher Identifier."

This "extended" access is accomplished by placing the extended file data in a range of addresses in otherwise unused space outside the range of addresses where the standard file data is placed. The extended file data is accessed by positioning a file pointer to a location in the extended range of addresses, and accessing the extended file data at the location of the file pointer.

A further embodiment includes a method of preventing inadvertent access to invalid or unexpected data, by preventing another access operation from occurring until the file pointer is repositioned to a new location. For example, access to standard file data is "locked" until the file pointer has been repositioned to a location in the standard addressing range where standard file data is stored.

In this way, extended file data, such as additional characteristics of the file, can be accessed, though these characteristics are not specifically known to the operating system.

DETAILED DESCRIPTION

For clarity of description, the operation of this invention will be described as it applies to a preferred embodiment for the UNIX operating system. Of course, the invention can be applied to other operating systems by suitable translation of the details describing the organization and operating of the operating system.

Figure 1:
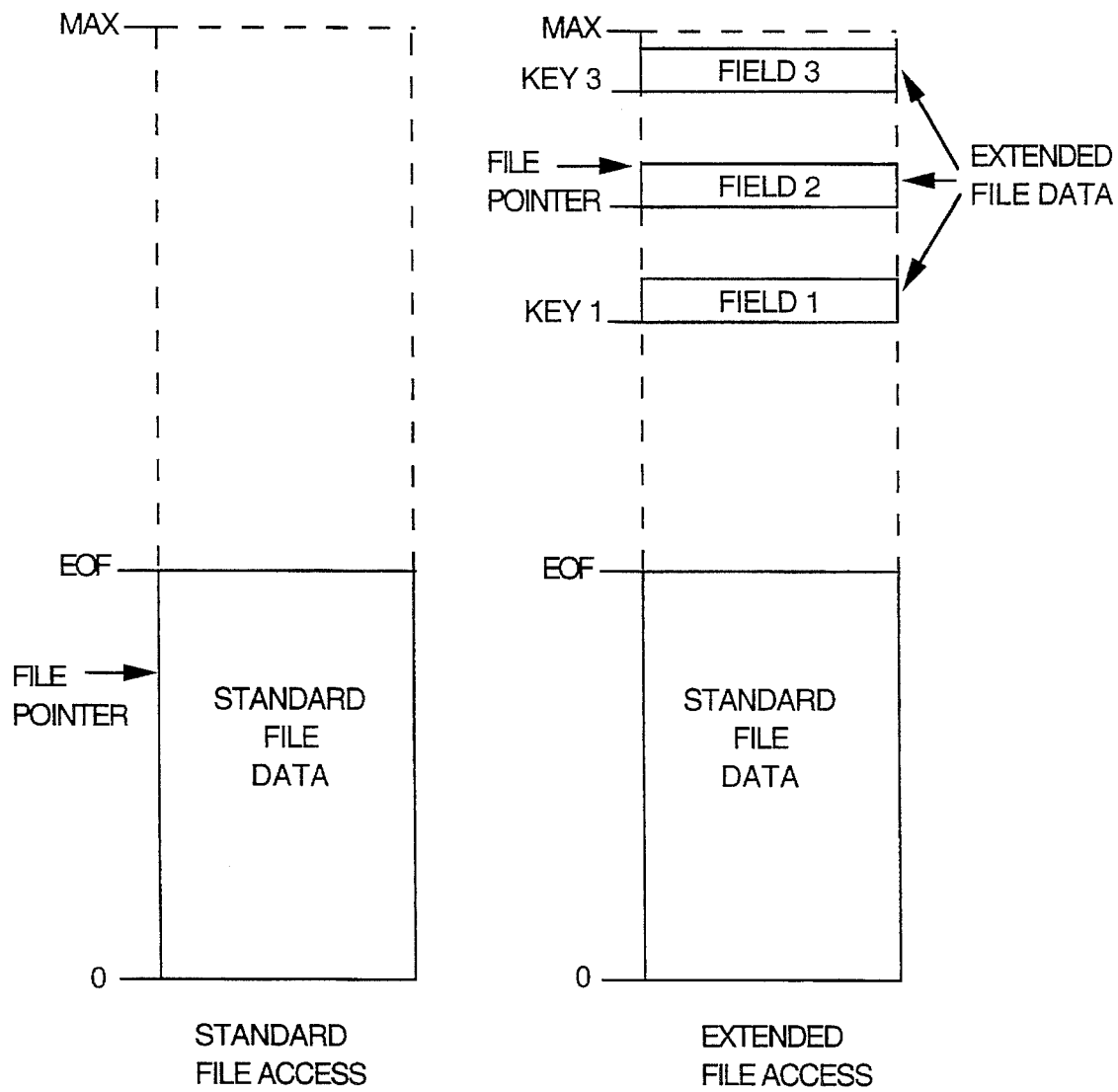
FIG. 1 shows a depiction of the range of address values at which data for a file is stored by the operating system of a computer.

FIG. 1 shows a depiction of the range of address values, address 0 to address MAX, at which data for a file is stored by the operating system of a computer. In the left side of FIG. 1 is a depiction of standard file access. To the right of FIG. 1 is a depiction of extended file access according to this invention.

Figure 2:
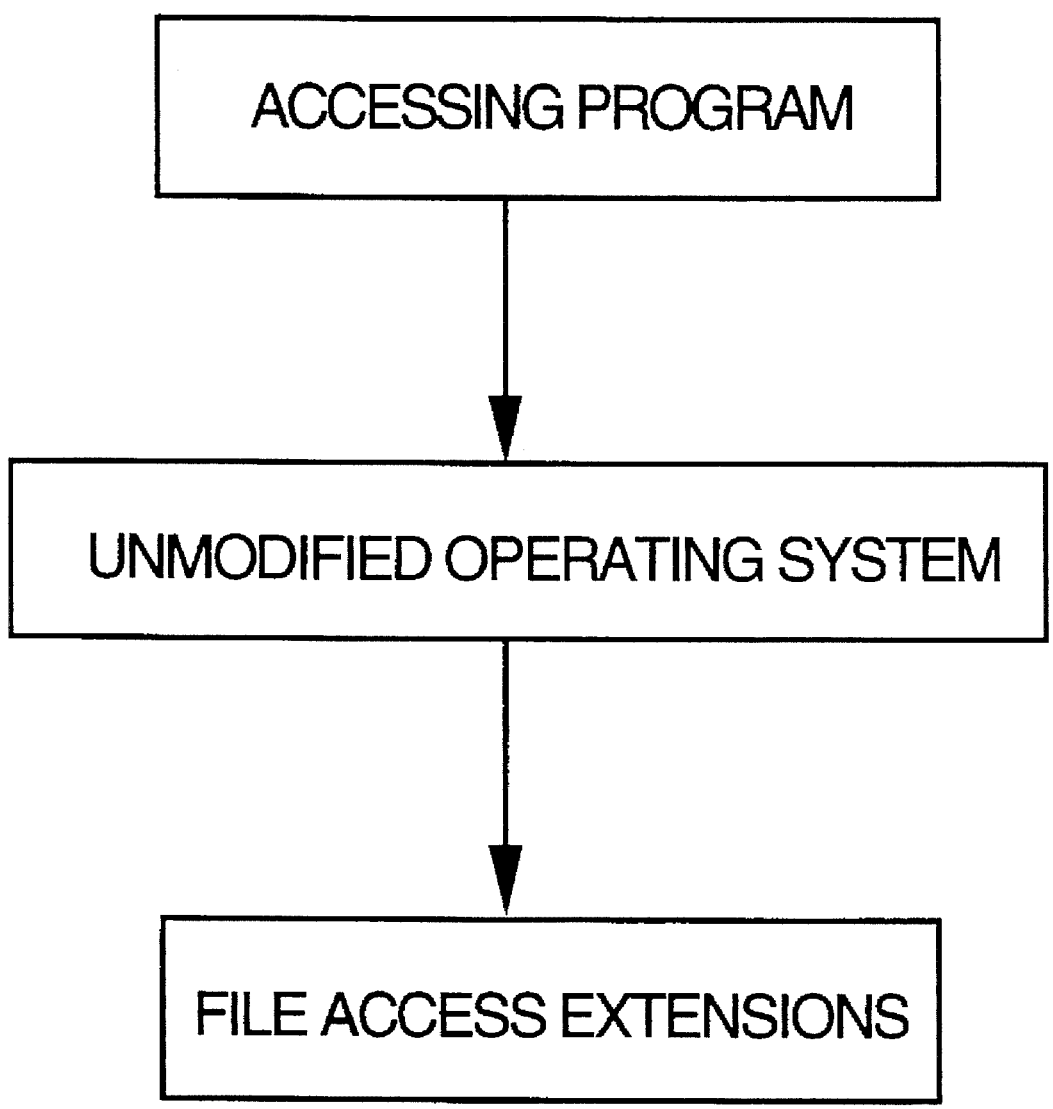
FIG. 2 shows a depiction of the software operating environment for a computer operating in accordance with this invention.

FIG. 2 shows a depiction of the software operating environment for a computer operating in accordance with this invention.

Starting at the left side of FIG. 1, in standard file access, the data read from a standard file is stored in logically sequential addresses from address 0 to an End-Of-File (EOF), defining a standard addressing range. A file pointer is positioned at the address at which the next access to data will occur. The file pointer advances automatically as reading or writing occurs, or can independently be repositioned using, for example, the UNIX "lseek" operating system call. The accessing program controls the file pointer to select the next portion of file data to be read. Each accessing program has its own corresponding file pointer.

In a preferred embodiment of extended file access, shown on the right side of FIG. 1, the data for extended file characteristics not known to the operating system are stored outside the range of addresses where are stored the data and characteristics that are standard and known to the operating system. Preferably, the extended data is placed at very high addresses close to the addressing limit of the space reserved for the file in order to leave the maximum room for standard file data in the lower addresses. Data stored at these high addresses would generally be considered "out-of-band" data with respect to the standard file data. This invention provides a method for access to this out-of-band data. Preferably, the extended file data is stored at "key" address values that are easily referenced by the accessing program. In a preferred embodiment, key values can be mapped to appear at multiple spots to provide flexibility in the management of the address space. Preferably, extended file data is stored in discrete fields with space between them.

In standard file access, positioning the file pointer and attempting to read or write beyond the EOF results in an error. In extended file access, positioning the file pointer and reading or writing beyond the EOF provides access to the extended file characteristics that are stored there, when the file pointer is aligned with the fields of extended file data.

In a preferred embodiment, after positioning the file pointer to the extended file data and performing the read or write function, the file pointer must be repositioned before another access can occur. This prevents inadvertent reading or writing of extended file data from occurring by programs attempting to access standard file data. It also prevents access to "invalid" regions between fields of extended file data. For example, as shown in the right of FIG. 1, after reading Field 2 of extended file data, the file pointer is at the end of the field and must be repositioned before another access can occur. If further access is attempted, the file pointer would move into the "invalid" region between fields and an error would occur. Repositioning can be required to a standard file data address, or to an extended file data address. Access to extended file data can occur through entire fields at a time, or partial reads and writes of a field can be allowed, although this may complicate the locking mechanisms to prevent erroneous data access. Of course, other file locking and access control mechanisms could be employed as alternatives.

The file pointer and positioning functions, and the read and write access functions are commonly available in the operating system. The locking function is easily implemented by the accessing program or by the operating system. Since these functions are available or can be easily provided, this invention fits well with operating systems in common use. These operating systems do not otherwise provide the capability to access new, unforeseen file formats. This method provides an extended access method by program control of these functions without any significant modification of the operating system.

The data for the extended characteristics could relate to files, directories, storage volumes, or data itself. The program that intends to access this data positions the file pointer to an extended data field, performs a read or write on the data, and activates the locking function that requires the file pointer to be repositioned before another access can occur. In many cases, the locking function is automatic since reading or writing advances the file pointer, and the completion of the access will leave the file pointer at the end of the extended data field where any further access without repositioning would cause an error.

Certain application programs will know of the extended data, how it is organized, and the size of the characteristic data and how to interpret it. But, the operating system need not know this information, and no other programs need to know this information.

A detail relevant to the UNIX implementation of this invention is that the lseek and other operating system calls are strictly defined in the standard implementations of the UNIX operating systems and should not be changed, in order to preserve compatibility of many other programs using the operating system calls. Therefore, the method of this invention can be used to obtain access to new file types and characteristics without modification of the operating system calls such as lseek or stat.

When many files share the same extended file data, for example, when the extended file characteristics apply to all the files within a particular directory, the extended file data can be stored once, rather than for every file. Also, specific fields of the extended file data can be stored at specific "key value" addresses to allow easy reference to these characteristics. The key values can be indexed in other files or programs. This allows access to the extended information by key value or an associated name rather than requiring a knowledge of the specific address.

The extended file data can be divided into separated data fields, or placed next to each other to allow continuous reading across field boundaries. It is preferred that entire fields are accessed during an operation, rather than allowing partial access that may leave the file pointer at an address other than a field boundary.

While read-only access to extended file data is very useful to obtain additional characteristics and descriptions about the file, in the preferred implementation, write access is provided so that all the extended characteristics can be generated for files that will later be transferred to a file type or media supporting the extended characteristics. For example, by having write access to extended file characteristics, a POSIX operating system can prepare files with extended file characteristics for eventual transfer to an ISO 9660 media that directly supports the additional characteristics.

FIG. 2 shows a depiction of the software operating environment for a computer operating in accordance with this invention. An accessing program utilizes the services of the underlying operating system to request access to file data. In this invention, the operating system remains unmodified. File access extensions underlying the operating system implement details of implementing read and write access to the extended fields and provide functions such as error checking.

This invention is particularly well suited to computers in a configuration in which a server computer storing large amounts and varying formats of data is accessed by several other client computers. Because the server supports many types of file storage devices, it is advantageous to implement the extended file access operations of this invention to allow access to all characteristics of the available files. Implementation of this invention allows the client computers to use the extended file access operations to access the extended file data of files on the server without any modifications to their own client computer operating systems. This can greatly reduce the need for many different types of operating system modifications when a configuration having many different types of client computers is supported, and yet the extended file access operations will be available to them all.

These and other embodiments of the invention will be apparent to one of skill in the art from a consideration of the specification, drawing and claims. It is intended that the scope of the invention be limited only by the scope of the following claims.

We claim:

1. A method for extended file access for a program running on a computer having a UNIX operating system which stores standard file data whose format has been predefined to said operating system, and which stores extended file data whose format has not been pre-defined to said operating system, said method comprising:

said program storing said standard file data and said extended file data by the steps of;

said program calling the services of said UNIX operating system to position a file pointer for said file to a first address in a standard addressing range for said file, whereby a write operation will write said standard file data at said first address; and said program calling the services of said UNIX operating system to position said file pointer to a second address in an extended range of addresses outside of said standard addressing range for said file, whereby a write operation will write said extended file data at said second address;

and, at a later time, said program reading said standard file data and said extended file data by the steps of;

said program calling the services of said UNIX operating system to position said file pointer to said first address, whereby a read operation will read said standard file data at said first address; and said program calling the services of said UNIX operating system to position said file pointer to said second address, whereby a read operation will read said extended file data at said second address.

2. A method for extended file access as in claim 1 further comprising that after a step of:

said program calling the services of said UNIX operating system to position said file pointer to said second address, whereby a read operation will read said extended file data at said second address;

said program preventing another read operation until after said file pointer has been positioned to an address in said standard addressing range.

3. A method for extended file access for a program running on a computer having a UNIX operating system which stores standard file data whose format has been predefined to said operating system, and which stores extended file data whose format has not been pre-defined to said operating system, said method comprising:

said program storing said standard file data and said extended file data by said program calling the services of said UNIX operating system to perform the steps of;

positioning a file pointer for said file to a first address in a standard addressing range for said file;

writing said standard file data at said first address;

positioning said file pointer to a second address in an extended range of addresses outside of said standard addressing range for said file; and writing said extended file data at said second address;

and, at a later time, said program reading said standard file data and said extended file data by said program calling the services of said UNIX operating system to perform the steps of;

positioning said file pointer to said first address;

reading said standard file data at said first address;

positioning said file pointer to said second address; and reading said extended file data at said second address.

4. A method for extended file access as in claim 3 further comprising that after a step of:

reading said extended file data at said second address;

said program preventing another step of reading until after said file pointer has been positioned to an address in said standard addressing range.

5. A method for extended file access for a program running on a client computer that accesses a server computer, said server computer having a UNIX operating system which stores standard file data whose format has been pre-defined to said operating system, and which stores extended file data whose format has not been pre-defined to said operating system, said method comprising:

said program running on said client computer accessing said server computer to store said standard file data and said extended file data by the steps of;

said program accessing said server computer and calling the services of said UNIX operating system to position a file pointer for said file to a first address in a standard addressing range for said file, whereby a write operation will write said standard file data at said first address; and said program accessing said server computer and calling the services of said UNIX operating system to position said file pointer to a second address in an extended range of addresses outside of said standard addressing range for said file, whereby a write operation will write said extended file data at said second address;

and, at a later time, said program running on said client computer accessing said server computer to read said standard file data and said extended file data by the steps of;

said program accessing said server computer and calling the services of said UNIX operating system to position said file pointer to said first address, whereby a read operation will read said standard file data at said first address; and said program accessing said server computer and calling the services of said UNIX operating system to position said file pointer to said second address, whereby a read operation will read said extended file data at said second address.

* * * * *